US012715242B2

(12) United States Patent
Sant'Anna et al.

(10) Patent No.: US 12,715,242 B2
(45) Date of Patent: Aug. 25, 2026

(54) VEHICLE WHEEL RIM, VEHICLE WHEEL INCLUDING SUCH A WHEEL RIM AND METHOD FOR PRODUCING SUCH A WHEEL RIM AND VEHICLE WHEEL

(71) Applicant: Maxion Wheels Holding GmbH, Königswinter (DE)

(72) Inventors: Adriano Phoenix Sant'Anna, Pocos de Caldas (BR); Marcio Aparecido de Oliveira, Limeira (BR); Renato de Jesus Madeira, Vinhedo (BR); Alexandre André Costa Motta, Sao José do Alegre (BR); Marcelo Yumoto Graziani, Limeira (BR); Ralf Duning, Solingen (DE); Iosef Fanizza, Königswinter (DE)

(73) Assignee: Maxion Wheels Holding GmbH, Königswinter (DE)

( * ) Notice: Subject to any disclaimer, the term of this patent is extended or adjusted under 35 U.S.C. 154(b) by 693 days.

(21) Appl. No.: 18/144,320

(22) Filed: May 8, 2023

(65) Prior Publication Data

US 2024/0375432 A1 Nov. 14, 2024

(51) Int. Cl.
*B60B 21/02* (2006.01)

(52) U.S. Cl.
CPC .......... *B60B 21/026* (2013.01); *B60B 21/023* (2013.01)

(58) Field of Classification Search
CPC ............................ B60B 21/023; B60B 21/026
See application file for complete search history.

(56) References Cited

U.S. PATENT DOCUMENTS

| | | | | |
|---|---|---|---|---|
| 4,610,482 A * | 9/1986 | Overbeck | B60B 3/10 29/894.323 |
| 5,579,578 A * | 12/1996 | Ashley, Jr. | B21D 53/30 29/894.353 |
| 2004/0124695 A1* | 7/2004 | Guimard | B60B 3/044 301/95.101 |

(Continued)

FOREIGN PATENT DOCUMENTS

| | | | |
|---|---|---|---|
| EP | 1543997 A1 * | 6/2005 | B60B 21/028 |
| FR | 2561144 A1 * | 9/1985 | B60B 3/044 |

(Continued)

*Primary Examiner* — Kip T Kotter
(74) *Attorney, Agent, or Firm* — MacMillan, Sobanski & Todd, LLC

(57) ABSTRACT

A vehicle rim including outboard and inboard bead seats and an annular well flank connected to the outboard bead seat and extending radially inwardly and towards the inboard side of the rim. A well base is connected to the well flank, wherein the well base defines a flat profile, and wherein the well base defines the inner-most radial dimension of the rim. A transition portion is defined between the well flank and the inboard bead seat. The transition portion has a circumferential corrugated profile having a circumferentially concave-shaped outboard groove connected to the well base at a first tangency point, a circumferentially convex-shaped ridge directly connected to the outboard groove at a second tangency point, and a circumferentially concave-shaped inboard groove directly connected to the ridge at a third tangency point. The inboard groove is connected to the inboard bead seat at a fourth tangency point.

25 Claims, 8 Drawing Sheets

(56) References Cited

U.S. PATENT DOCUMENTS

| | | | | |
|---|---|---|---|---|
| 2005/0253447 | A1* | 11/2005 | Abe | B21D 53/30 301/95.108 |
| 2011/0101770 | A1* | 5/2011 | Brame | B60B 3/044 301/95.101 |
| 2023/0052941 | A1 | 2/2023 | Rode et al. | |
| 2023/0241912 | A1* | 8/2023 | Brame | B60B 21/028 301/95.101 |

FOREIGN PATENT DOCUMENTS

| | | | | | |
|---|---|---|---|---|---|
| GB | 588782 | A | * | 6/1947 | B60B 21/02 |
| WO | WO-2020161550 | A2 | * | 8/2020 | B60B 21/104 |

* cited by examiner

VEHICLE WHEEL RIM, VEHICLE WHEEL INCLUDING SUCH A WHEEL RIM AND METHOD FOR PRODUCING SUCH A WHEEL RIM AND VEHICLE WHEEL

BACKGROUND OF THE INVENTION

The present invention relates in general to a vehicle wheel rim and vehicle wheel and in particular to an improved wheel rim, vehicle wheel including such a wheel rim and method for producing such a wheel rim and vehicle wheel.

Wheels for automotive vehicles may be formed by joining multiple components together. For example, a wheel may consist of two formed steel parts joined together, such as by welding. One known conventional wheel includes a generally planar or circular wheel disc welded to an outer circumferential edge portion of an annular rim. The rim has a suitable annular shape for receiving and supporting a tire mounted thereon. The wheel disc includes a central hub portion that functions as a wheel mounting portion of the wheel for connecting with an axle via a plurality of lug bolts and lug nuts.

It is known to produce a rim by first forming a steel blank into a hoop. The hoop can be further processed via a flow forming process to form the profile shape of the rim. Flow forming is basically a metal-forming technique in which a metallic workpiece is formed over a mandrel by one or more rollers using pressure. The roller deforms the workpiece, forcing it against the mandrel, both axially lengthening and radially thinning it. Conventional rims which are made by flow forming generally have uniform surfaces on their inner and outer sides of the rim. Although such flow forming processes provide rims having sufficient rigidity, it would be desirable to produce a rim which optimizes the material usage of the rim for reducing the overall mass of the wheel disc and as well as minimizing stress levels during use of the wheel.

SUMMARY OF THE INVENTION

The present invention relates in general to a vehicle wheel rim and vehicle wheel and in particular to an improved wheel rim, vehicle wheel including such a wheel rim and method for producing such a wheel rim and vehicle wheel as illustrated and/or described herein.

According to one embodiment, the wheel may comprise, individually and/or in combination, one or more of the following features, elements, or advantages: a wheel including an annular rim defining an axis and inboard and outboard sides. The rim includes an outboard bead seat, an inboard bead seat, and an annular well flank connected to the outboard bead seat and extending radially inwardly and towards the inboard side of the rim. A well base is connected to the well flank, wherein the well base defines a flat profile, and wherein the well base defines the inner-most radial dimension of the rim. A transition portion is defined between the well flank and the inboard bead seat, wherein the transition portion has a circumferential corrugated profile having a circumferentially concave-shaped outboard groove connected to the well base at a first tangency point, a circumferentially convex-shaped ridge directly connected to the outboard groove at a second tangency point, and a circumferentially concave-shaped inboard groove directly connected to the ridge at a third tangency point. The inboard groove is connected to the inboard bead seat at a fourth tangency point. The wheel further includes a wheel disc secured to the rim, wherein the wheel disc includes a hub located centrally within the wheel disc and having a plurality of bolt holes formed therein.

According to this embodiment, the flat profile of the well base has a frustoconical shape.

According to this embodiment, the frustoconical shape of the well base is formed at an angle with respect to the wheel axis within the range of about 0 degrees to about 25 degrees.

According to this embodiment, the well base has a constant thickness.

According to this embodiment, the well base is smoothly connected to the well flank via a curved portion.

According to this embodiment, the transition portion has an outer surface and an inner surface defining a thickness therebetween such that the thickness of at least a portion of the transition portion varies between the first and fourth tangency points.

According to this embodiment, the at least a portion of the transition portion has a thinning between about 7% to about 30% the thickness of the well flank.

According to this embodiment, an outboard side of the outboard groove adjacent the first tangency point has a greater thickness than an inboard side of the outboard groove adjacent the second tangency point.

According to this embodiment, the ridge has a constant thickness between the second and third tangency points.

According to this embodiment, an inboard side of the inboard groove adjacent the fourth tangency point has a greater thickness than an outboard side of the inboard groove adjacent the third tangency point.

According to this embodiment, the outboard groove has an arcuate shape defined by a first radius.

According to this embodiment, the ridge has an arcuate shape defined by a second radius.

According to this embodiment, the inboard groove has an arcuate shape defined by a third radius.

According to this embodiment, the second radius is greater than either of the first and third radii.

According to this embodiment, the first radius is greater than the third radius.

According to this embodiment, the rim includes an inboard bead seat retaining flange connected to the inboard bead seat.

According to this embodiment, the rim includes an outboard bead seat retaining flange connected to the outboard bead seat.

According to this embodiment, the wheel is a bead seat wheel such that the wheel disc is secured to the rim at the outboard beat seat.

According to this embodiment, the wheel is drop center wheel such that the wheel disc is secured to the rim at the outboard groove.

According to this embodiment, the wheel is a full face wheel such that the wheel disc includes an outboard bead seat retaining flange integrally formed therein, and wherein the wheel disc is connected to the rim at the outboard bead seat.

According to this embodiment, the rim is produced by forming a metallic blank.

According to this embodiment, the metallic blank is a steel blank.

According to this embodiment, the rim is formed into a final desired shape by a flow forming process.

According to this embodiment, the wheel disc is produced by forming a metallic blank by a flow forming process.

According to another embodiment, the wheel rim may comprise, individually and/or in combination, one or more of the following features, elements, or advantages: a wheel rim defining an axis and inboard and outboard sides, an outboard bead seat; an inboard bead seat; an annular well flank connected to the outboard bead seat and extending radially inwardly and towards the inboard side of the rim; a well base connected to the well flank, wherein the well base defines a flat profile, and wherein the well base defines the inner-most radial dimension of the rim; and a transition portion defined between the well flank and the inboard bead seat, wherein the transition portion has a circumferential corrugated profile having: a circumferentially concave-shaped outboard groove connected to the well base at a first tangency point; a circumferentially convex-shaped ridge directly connected to the outboard groove at a second tangency point; and a circumferentially concave-shaped inboard groove directly connected to the ridge at a third tangency point, and wherein the inboard groove is connected to the inboard bead seat at a fourth tangency point.

Various aspects of this invention will become apparent to those skilled in the art from the following detailed description of the preferred embodiments, when read in light of the accompanying drawings.

DETAILED DESCRIPTION OF THE PREFERRED EMBODIMENTS

Figure 1:
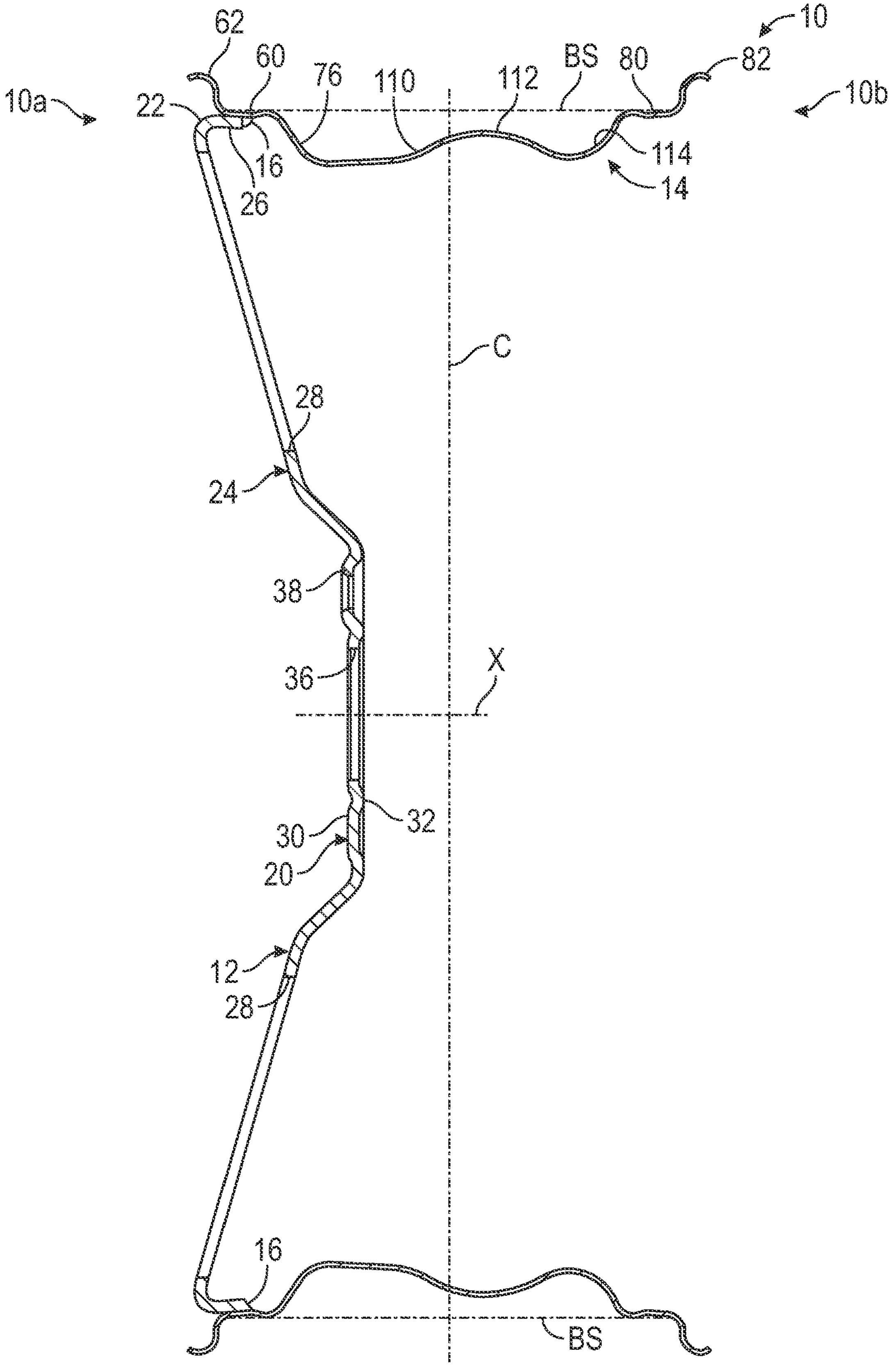
FIG. 1 is a cross-sectional view of an embodiment of a vehicle wheel in accordance with the present invention.
Figure 2:
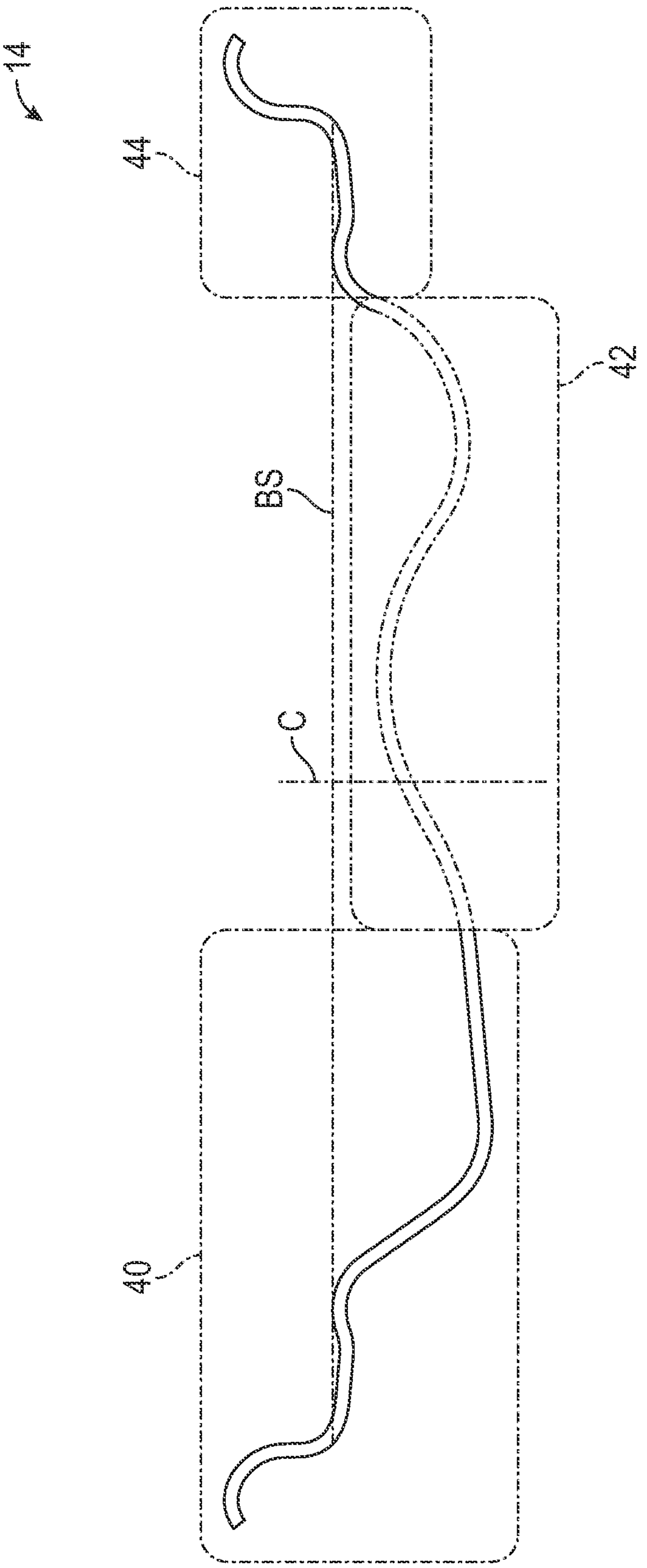
FIG. 2 is an enlarged schematic cross-sectional view of a portion of a rim of the vehicle wheel of FIG. 1 illustrating various regions of the rim.

Referring now to the drawings, there is illustrated in cross-section in FIGS. 1 through 4 a "bead seat" vehicle wheel, indicated generally at 10. The vehicle wheel 10 generally incudes a wheel disc, indicated generally at 12, and an annular outer wheel rim, indicated generally at 14. Although the invention is illustrated and described in conjunction with the particular vehicle wheel construction disclosed herein, it will be appreciated that the invention can be used in conjunction with other types of vehicle wheel constructions.

The wheel 10 can be generally described as having an outboard side, indicated generally at 10*a*, on the left-hand side as viewing FIG. 1. The wheel 10 has an inboard side, indicated generally at 10*b*, on the right-hand side as viewing FIG. 1. When mounted on the vehicle, the wheel disc 12 is on the outboard side 10*a*.

In a preferred embodiment (and as illustrated herein), the wheel disc 12 and the wheel rim 14 are produced separately and then joined together by any suitable means, such as by welding, to produce a fabricated vehicle wheel 10. In a preferred embodiment, the wheel disc 12 and the wheel rim 14 are made from steel and are then welded together, such as at a weld 16, to form the wheel 10. Of course, the wheel disc 12 and/or the wheel rim 14 may be made of any suitable materials such as for example, aluminum, magnesium, titanium or alloys thereof, carbon fiber and/or composite materials and/or may be secured together by other suitable means, if so desired.

The combination of the annularly shaped wheel disc 12 and the wheel rim 14 defines a wheel axis X for the wheel 10. The wheel disc 12 generally includes a centrally located hub, indicated generally at 20, an outer circumferential edge 22, and an annular or circular disc body portion, indicated generally at 24. The hub 20 is preferably circular and is generally defined as the central portion of the wheel disc 12. The outer circumferential edge 22 of the "bead seat" wheel disc 12 includes a circular flange 26 which is welded (or otherwise attached) via the weld 16 to a bead seat portion of the rim 14, as will be discussed below.

The disc body portion 24 is generally annulus or ring-shaped and encircles the hub 20. The disc body portion 24 radially extends between the hub 20 and the outer circumferential edge 22. The disc body portion 24 preferably includes a plurality of ventilation holes 28 formed therein. The vent holes 28 not only provide ventilation for wheel brakes (not shown) mounted adjacent to the wheel 10 but also help in reducing the overall weight or mass of the wheel 10. The disc body portion 24 can have any number of ventilation holes 28 formed therein having any suitable shape. Alternatively, the disc body portion 24 can be formed with a plurality of spokes (not shown) radially extending between the hub 20 and the outer circumferential edge 22.

In the illustrated embodiment shown in FIG. 1, the hub 20 has a front face or surface 30, and a rear face or surface 32. The front surface 30 is located on the outboard side 10*a* of the wheel 10 and faces the outboard side 10*a* when mounted on a vehicle. The rear surface 32 faces towards the inboard side 10*b* of the wheel 10. The hub 20 functions as a wheel mounting portion or center mounting portion of the wheel 10 for connecting with an axle (not shown) via a plurality of lug bolts (not shown) and lug nuts (not shown).

The hub 20 includes a centrally located pilot aperture or hub hole 36. The hub hole 36 extends through and about the wheel axis X. The hub hole 36 may accommodate a portion of the axle and/or receive a protective/decorative cap (not shown). The hub hole 36 may have any suitable diameter. A plurality of lug bolt receiving holes 38 are formed in the hub 20 and are circumferentially spaced around the hub hole 36 and the wheel axis X. For example, the hub 20 may include five lug bolt receiving holes 38. Alternatively, the number and/or location of the lug bolt receiving holes 38 may be other than illustrated if so desired. The lug bolt receiving holes 38 receive the lug bolts (not shown) for securing the vehicle wheel 10 with lug nuts (not shown) on the axle of an associated vehicle.

In a preferred embodiment, the wheel disc 12 is preferably produced from a single steel blank (not shown) which is then formed by suitable means to form the wheel disc 12. The blank may be first provided as a smooth, flat annular or ring-shaped steel disc blank, and then preferably shaped such as by a flow forming process into the final wheel disc shape. Alternatively, the blank may be formed by any suitable means, such as stamping and/or flow forming, into a wheel disc "preform" (not shown) having a particular partially formed wheel disc shape before it is formed into the final wheel disc shape, preferably by flow forming.

The wheel rim 14 can have any suitable annular shape for receiving and supporting a tire (not shown). The wheel rim 14 preferably has a continuous annular shape relative to the wheel axis X for accommodating a vehicle tire (not shown) mounted thereon. Referring now to the schematic cross-section illustration of FIG. 2, the rim 14 can be described as having generally three segments or regions: an outboard portion, indicated generally within broken lines 40, a middle transition portion, indicated generally within broken lines 42, and an inboard portion, indicated generally within broken lines 44. In general, the outboard and inboard portions 40 and 44 are formed with a standard profile commonly used in the industry to accommodate the proper mounting of various tires used in the marketplace. The thickness of the rim 14 at these outboard and inboard portions 40 and 44 may be generally constant. However, in accordance with the present invention, the portions of the rim 14 within the transition portion 42 are specifically designed and produced to provide structural advantages for the rim 14. For example, the transition portion 42 may be formed with undulating waved or curved portions (as will be explained in detail below) to help reduce stress levels within the rim 14 as well as providing for a reduction in the mass of the rim 14. These advantages can be obtained by the specific geometry and number of the curves within the transition portion 42. Additionally, these advantages may also be provided by optionally varying the thickness of the rim 14 within the transition portion 42. During the design stage of the transition portion 42, stress levels at critical points within the wheel 10 are discovered and considered in determining the final shape of the transition portion 42. Thus, the shape of the rim 14 within the transition portion 42 can affect the optimization results in order to achieve desired performance requirements.

The rim 14 may be manufactured by any suitable method. In a preferred method, the rim 14 is at least partially formed by a rolling and forming process to obtain the desired annular shape, as shown in FIGS. 1 through 4. Suitable methods of producing a vehicle rim are described in U.S. Pat. Nos. 5,579,578 and 4,962,587 both of which are incorporated by reference herein. There is illustrated in FIG. 5 a block diagram showing a sequence of steps of a suitable method for producing the rim 14. Initially, in step 50, a flat sheet of suitable material or blank, such as for example, steel or aluminum, is formed into a generally cylindrical hoop or band (not shown) and welded. When the hoop is welded in step 50, a flat surface may be created by the weld. As a result of this, the hoop is expanded in step 52 to produce a substantially cylindrical hoop. The hoop is then subjected to a flow spinning process in step 54 to form a preform. Outboard and inboard end portions of the preform are then flared in step 56 to generally form the outboard and inboard portions 40 and 44. The rim may then be initially roll formed in step 58 such as to provide the desired profile of the transition portion 42. The rim is then subjected to a series of roll forming operations in steps 60 and 62. If needed, the rim may be expanded in step 64 to produce the finished rim 14. The rim 14 can then be secured to the wheel disc 12, such as by the weld 16, in step 66, thereby producing the finished wheel 10.

The structural details of the rim 14 will now be explained with respect to FIGS. 3 and 4. It should be understood that the illustrations of the rim 14 shown in cross-section in FIGS. 2 through 4 lack cross-sectional lines to help with clarity and understanding of the drawings in FIGS. 2 through 4. Additionally, only the profile or section of the portion of the rim 14 is illustrated and background object lines have been removed for clarity. Lastly, the details of the drawings in the Figures are not necessarily to scale and may have exaggerated dimensions to assist in clarity and understanding of the drawings.

The outboard portion 40 includes an outboard bead seat 60 adjacent to and connected with an outboard bead seat retaining flange 62. The outboard bead seat 60 (in cooperation with the inboard bead seat 80) provides a mounting and contacting surface 64 for sealing with a tire (not shown) mounted on the wheel 10. A broken line, indicated generally by BS, schematically represents the bead seat diameter or inner diameter portion of a tire that is mounted on the wheel 10. The conventionally known "rim width" may be determined as the axial distance between the bead seats 60 and 80. The wheel diameter is generally the radial diameter of the respective bead seats. It should be appreciated that the rim 14 can have any desired diameter and/or shape. The wheel 10 can be manufactured to any suitable size for mounting a tire thereon. Tire sizes for conventional vehicles are generally within the range of about 16 inches (406 mm) to about 22 inches (560 mm), for example. In a preferred embodiment, the rim 14 has an outer diameter or a wheel diameter within the range of about 405 millimeters (about 16 inches), to about 560 millimeters (about 22 inches).

The outboard bead seat retaining flange 62 generally provides for lateral or axial support of the tire mounted on the wheel 10. The outboard bead seat retaining flange 62 includes a sidewall 68 and a curled lip portion 70 ending in an outer edge 72. The sidewall 68 may be smoothly connected with the outboard bead seat 60 by a curved portion 74. The outboard portion 40 also includes a well flank or side wall 76 connected to the bead seat 60 via a curved retaining hump 78. The well flank 76 generally extends radially inwardly and in a direction towards the inboard portion 44. The well flank 76 may have a generally frustoconical shape about the wheel axis X. The innermost radial portion of the well flank 76 may end in a curved portion 79. As will be discussed below, the curved portion 79 is connected to a well base 100.

The inboard portion 44 is similar in structure as the outboard portion 40 without having a well flank or side wall. The inboard portion 44 includes an inboard bead seat 80 adjacent to and connected with an inboard bead seat retaining flange 82. Similar to the outboard bead seat 60, the inboard bead seat 80 provides a mounting and contacting surface 84 for sealing with a tire (not shown) mounted on the wheel 10. The inboard bead seat retaining flange 82 includes a sidewall 88 and a curled lip portion 90 ending in an outer edge 92. The sidewall 88 may be smoothly connected with the inboard bead seat 80 by a curved portion 94. The other side of the inboard bead seat 80 is connected to a curved retaining hump 98. The end of the retaining hump 98 generally defines the inner boundary of the inboard portion 40. When the wheel 10 is formed by joining the wheel disc 12 to the rim 14, the wheel 10 defines a centerline C or center-plane that is approximately located equally spaced axially from the bead seats 60 and 80.

The rim 14 defines a tire well, indicated generally at 99, which generally defines the cavity or open region between the bead seats 60 and 80. The tire well 99 may be defined as the open region generally radially inwardly from (or below as viewing FIGS. 2 through 4) the bead seat diameter BS.

The well base 100 extends in a direction towards the inboard portion 44 from the curved portion 79 of the well flank 78. The well base 100 has a first or inboard end 102 smoothly connected to the curved portion 79. The well base 100 also has a second or inboard end 104 connected to the transition portion 42, as will be described below. The well base 100 defines the lowest part of the well 99 or, in other words, the inner-most radial dimension of the rim 14. In a preferred embodiment, the well base 100 has a relatively straight profile shape in cross-section, as shown in FIG. 3. Although the well base 100 can be formed having a cylindrical shape about the wheel axis X, in a preferred embodiment the well base 100 is angled at a slight angle S relative to the wheel axis X, thereby forming a slightly angled frustoconical shape about the wheel axis X. In a preferred embodiment, the angle S is within the range of about 0 degrees to about 15 degrees. In a more preferred embodiment, the angle S is within the range of about 1 degrees to about 10 degrees. The well base 100 can have any suitable axial length. In a preferred embodiment, the well base 100 has a constant thickness $t_w$, as shown in FIG. 4. If desired, the thickness $t_w$ of the well base 100 may vary in thickness across its axial length, such as for example, by a flow forming process.

The details of the transition portion 42 will now be discussed. As shown in FIG. 3, the transition portion 42 is formed by a plurality of undulations or curved portions having a generally smooth circumferential corrugated profile. More specifically, the transition portion 42 of the illustrated embodiment includes namely three curved portions: an outboard curve or groove 110, a ridge 112, and an inboard groove 114. The outboard groove 110 preferably has a circumferentially concave-shape such that it dips towards the well base 100 radially inwardly inside the well 99. The inboard groove 114 preferably has a circumferentially concave-shape such that it dips radially inwardly inside the well 99. The ridge 112 preferably has a circumferentially convex-shape extending radially outwardly.

Figure 3:
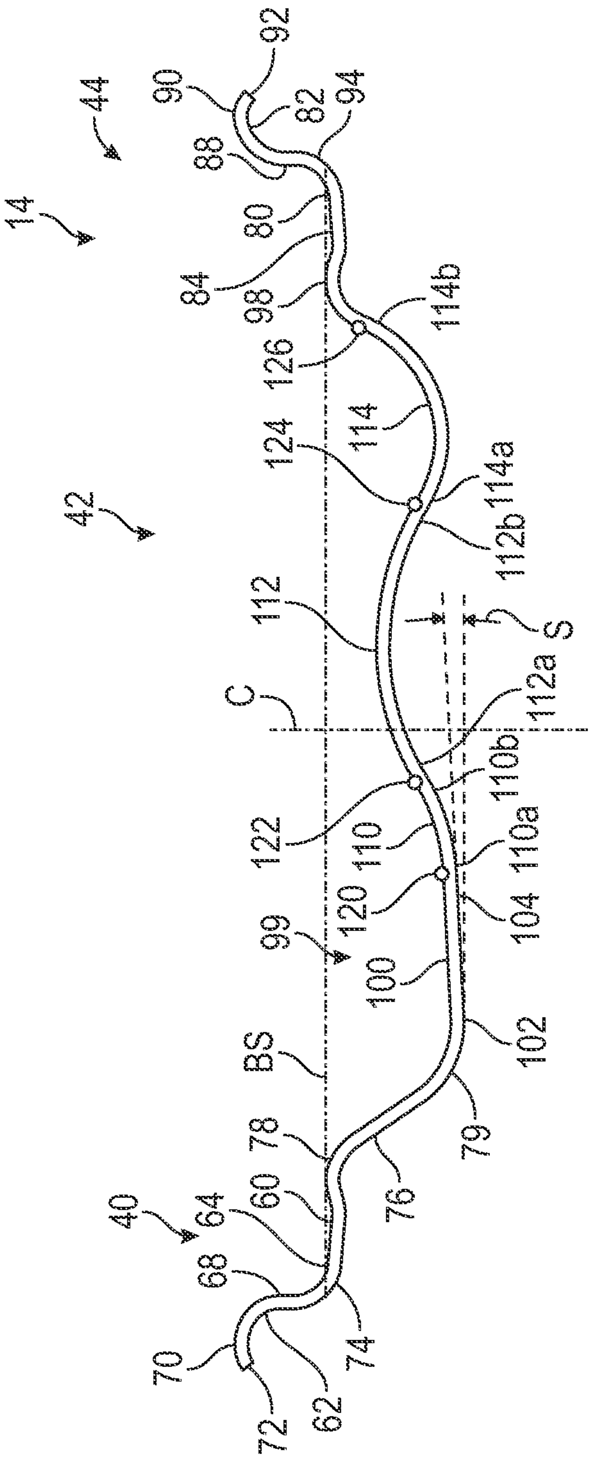
FIG. 3 is an enlarged schematic cross-sectional view of a portion of the rim of the wheel of FIG. 1 indicating locations of tangency points between various features of the rim.

Referring to FIG. 3, the outboard groove 110 has a first end 110*a* which is connected to the inboard end 104 of the well base 100 at a first tangency point 120. It should be understood that the first tangency point 120 (and others) is not a single point but a circumferential circle since the grooves and ridges 110, 112, and 114 are circumferentially and annularly shaped about the wheel axis X. The tangency points are schematically illustrated in the Figures as small circular icons indicating the location of the tangency point. The outboard groove 110 has a second end 110*b* which is directly connected to a first end 112*a* or the ridge 112 at a second tangency point 122. A second end 112*b* of the ridge 112 is directly connected with a first end 114*a* of the inboard groove 114 at a third tangency point 124. A second end 114*b* of the inboard groove 114 is connected with the retaining hump 98 at a fourth tangency point 126. Note that the connections of the various features of the rim 14 at the tangency points 120, 122, 124, and 126 are such that they are preferably smoothly blended and connected together without any sharp bends or corners. The outboard groove 110, the ridge 112, and the inboard groove 114 preferably have a circumferential and arcuate shape such that they are connected at tangents with one another, thereby providing for a smooth transition therebetween. As discussed above, in a preferred embodiment, the profile of the transition portion 42 is generally formed by a flow-forming process. This flow forming process may, for example, generally start at the first tangency point 120 and finish at the fourth tangency point 126.

Figure 4:
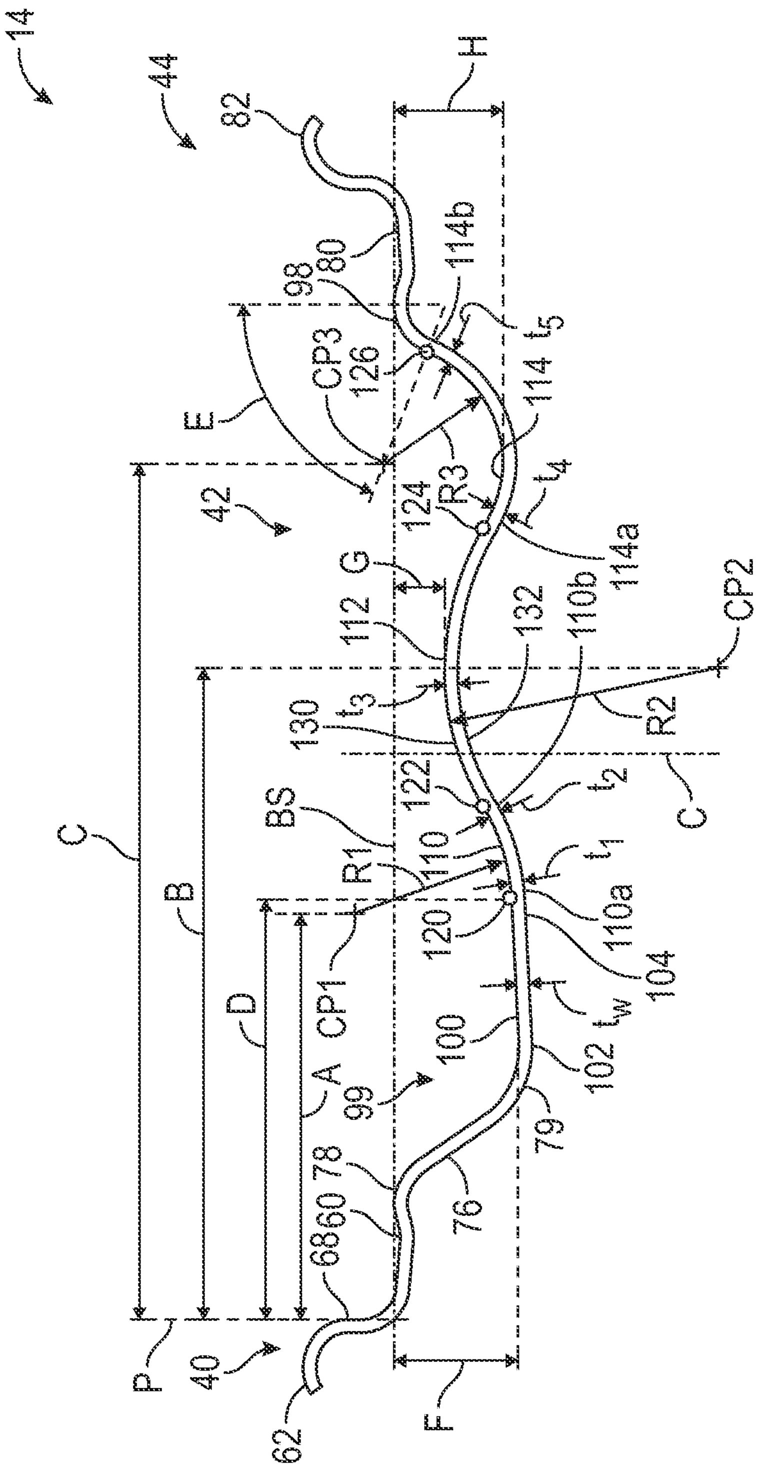
FIG. 4 is an enlarged schematic cross-sectional view of the portion of the rim of FIG. 3 including dimensional information of the rim.
Figure 5:
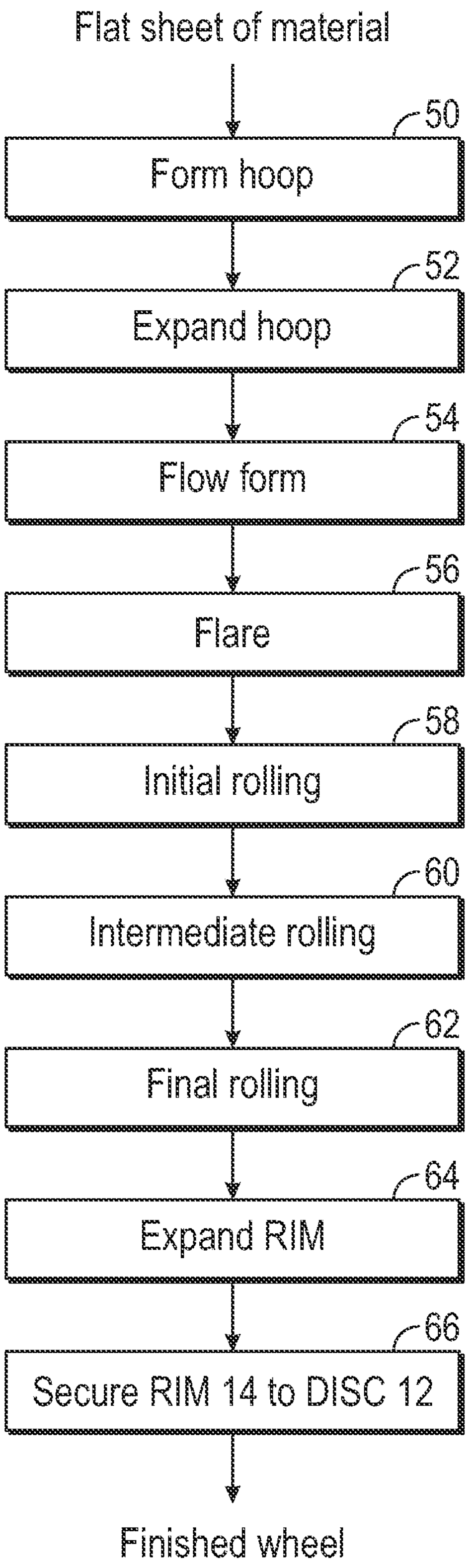
FIG. 5 is a flowchart describing one embodiment of a process for forming the rim of FIG. 1.

As shown in FIG. 4, the outboard groove 110 has an arcuate shape generally defined by a radius R1 stemming from a center point CP1. It should be understood that the center point CP1 (and others) is not a single point but a circumferential circle since the grooves and ridges 110, 112, and 114 are circumferentially and annularly shaped about the wheel axis X. The ridge 112 has an arcuate shape generally defined by a radius R2 stemming from a center point CP2. The outboard groove 114 has an arcuate shape generally defined by a radius R3 stemming from a center point CP3. In a preferred embodiment, the radius R1 is within the range of about 20 millimeters to about 120 millimeters. In a more preferred embodiment, the radius R1 is within the range of about 20 millimeters to about 90 millimeters. In a preferred embodiment, the radius R2 is within the range of about 10 millimeters to about 120 millimeters. In a more preferred embodiment, the radius R2 is within the range of about 20 millimeters to about 90 millimeters. In a preferred embodiment, the radius R3 is within the range of about 10 millimeters to about 120 millimeters. In a more preferred embodiment, the radius R3 is within the range of about 20 millimeters to about 90 millimeters.

In a preferred embodiment, the radius R2 is greater than either of the radii R1 and R3. Additionally, in a preferred embodiment, the radius R1 is greater than the radius R3. It has been found that the profile of the transition portion 42 along with the structure of the well base 100 of the illustrated embodiment provides for a suitable reduction in stress levels of the wheel 10 as well as providing a reduction in mass.

As shown in FIG. 4, there is a reference plane P radially extending from the outboard sidewall 68. The center point CP1 for the radius R1 may be positioned by an axially extending distance A from the plane P. In a preferred embodiment, the distance A is within the range of about 30 millimeters to about 60 millimeters. In a more preferred embodiment, the distance A is within the range of about 35 millimeters to about 55 millimeters. The center point CP2 for the radius R2 may be positioned by an axially extending distance B from the plane P. In a preferred embodiment, the distance B is within the range of about 20 millimeters to about 180 millimeters. In a more preferred embodiment, the distance B is within the range of about 30 millimeters to about 150 millimeters. The center point CP3 for the radius R3 may be positioned by an axially extending distance C from the plane P. In a preferred embodiment, the distance C is within the range of about 90 millimeters to about 200 millimeters. In a more preferred embodiment, the distance C is within the range of about 90 millimeters to about 180 millimeters.

In general, the position of the first and fourth tangency points 120 and 126 generally depends on the width of the wheel disc 12. For example, the first tangency point 120 may be axially positioned from the plane P by a distance D. In a preferred embodiment, the distance D is within the range of about 67 millimeters to about 120 millimeters. The tangency points 120, 122, 124, and 126 may be positioned anywhere within the transition portion 42 such that they smoothly flow into the respective intersecting curves. For example, it is preferred that the inboard groove 114 smoothly flows into the arcuately curved retaining hump 98. To accomplish this, the tangency point 126 can be positioned relative to the retaining hump 98 at an angle E with respect to a plane perpendicular to the wheel axis X. In a preferred embodiment, the angle E is within the range of about 45 degrees to about 90 degrees.

In a preferred embodiment, the outboard end 102 of the well base 100 defines the inner-most radial dimension of the rim 14 or, in other words, the deepest point of the well 99 and closest to the wheel axis X. This distance can be generally represented by a distance F extending radially inwardly from the bead seat diameter BS, as shown in FIG. 4. In a preferred embodiment, the distance F is within the range of about 15 millimeters to about 30 millimeters. In a more preferred embodiment, the distance F is within the range of about 17.5 to about 25 millimeters. The distance of the peak of the ridge 112 from the bead seat diameter BS is generally shown as the distance G. In a preferred embodiment, the distance G is within the range of about 3 millimeters to about 15 millimeters. In a more preferred embodiment, the distance G is within the range of about 5 to about 10 millimeters. The distance of the innermost point of the inboard groove 114 from the bead seat diameter BS is generally represented by the distance H. In a preferred embodiment, the distance H is within the range of about 15 millimeters to about 30 millimeters. In a more preferred embodiment, the distance H is within the range of about 17.5 to about 25 millimeters. In the illustrated and preferred embodiment, the distance F is greater than the distance H.

As stated above, the rim 14 may have any desired thickness extending along the axial direction. For example, the portion of the rim 14 within the transition portion 42 may have a constant thickness. This thickness can correspond to or generally be the same as the thickness of the rim 14 within the outboard and inboard portions 40 and 44. Alternatively, the thickness of the portion of the rim 14 within the transition portion 42 may vary in the axial direction between respective tangency points 120, 122, 124, and 126. One or more of the outboard groove 110, the ridge 112, and the inboard groove 114 can each have a different thickness, or the thickness within one or more of the outboard groove 110, the ridge 112, and the inboard groove 114 may vary. For example, the thickness of the rim 14 within a central region of the transition portion 42 may be thinner than the thickness of the outer portions adjacent the outboard and inboard portions 40 and 44.

In one preferred embodiment, the transition portion 42 has a varying thickness. Referring to FIG. 4, the transition portion 42 has an outer surface 130 and an inner surface 132 defining a thickness therebetween. The thickness of the outboard groove 110 generally adjacent to the tangency point 120 is defined as a thickness $t_1$. The thickness $t_1$ can generally be defined as being located on an outboard side (first end 110*a*) of the outboard groove 110. The thickness of the outboard groove 110 generally adjacent to the tangency point 122 is defined as a thickness $t_2$. The thickness $t_2$ can generally be defined as being located on an inboard side (second end 110*b*) of the outboard groove 110. The thickness of the ridge 112 is represented as a thickness $t_3$. The thickness of the inboard groove 114 generally adjacent to the tangency point 124 is defined as a thickness $t_4$. The thickness $t_4$ can generally be defined as being located on an outboard side (first end 114*a*) of the inboard groove 114. The thickness of the inboard groove 114 generally adjacent to the tangency point 126 is defined as a thickness $t_5$. The thickness $t_5$ can generally be defined as being located on an inboard side (second end 114*b*) of the inboard groove 114.

In the preferred embodiment, the thickness $t_1$ is greater than the thickness $t_2$ such that the thickness of the outboard groove 110 narrows from the outboard towards the inboard direction. In furtherance of the preferred embodiment, the thickness $t_5$ may be greater than the thickness $t_4$ such that the thickness of the inboard groove 114 narrows from the inboard towards the outboard direction. The thickness of the ridge 112 may remain constant such that the thicknesses $t_2$, $t_3$, and $t_4$ are relatively the same and the thickness $t_3$ is constant between the tangency points 122 and 124. Of course, this is just and example of one embodiment and it should be understood that the thicknesses $t_1$, $t_2$, $t_3$, $t_4$, and $t_5$ may have any suitable dimension.

In a preferred embodiment, the reduction in thickness of the thicknesses $t_1$, $t_2$, $t_3$, $t_4$, and $t_5$ is within the range of about 7% to about 30% the thickness of the well flank 76, for example, or any other portion of the rim 14 within the outboard and inboard portions 40 and 44 generally prior to a flow forming step. It has been found that one suitable example of an embodiment of the rim 14 provides for a thickness of the well flank 76 and well base 100 and the thicknesses $t_1$ and $t_5$ being about 2.3 millimeters. In this example, a suitable thickness for the thicknesses $t_2$, $t_3$, and $t_4$ is about 1.7 millimeters. Note that due to the varying thickness between the outer and inner surfaces 130 and 132 of the grooves 110 and 114, the surfaces 130 and 132 will not be perfectly arcuate with respect to Radii R1 and R3 and thus are not precisely concentric with one another.

Figure 6:
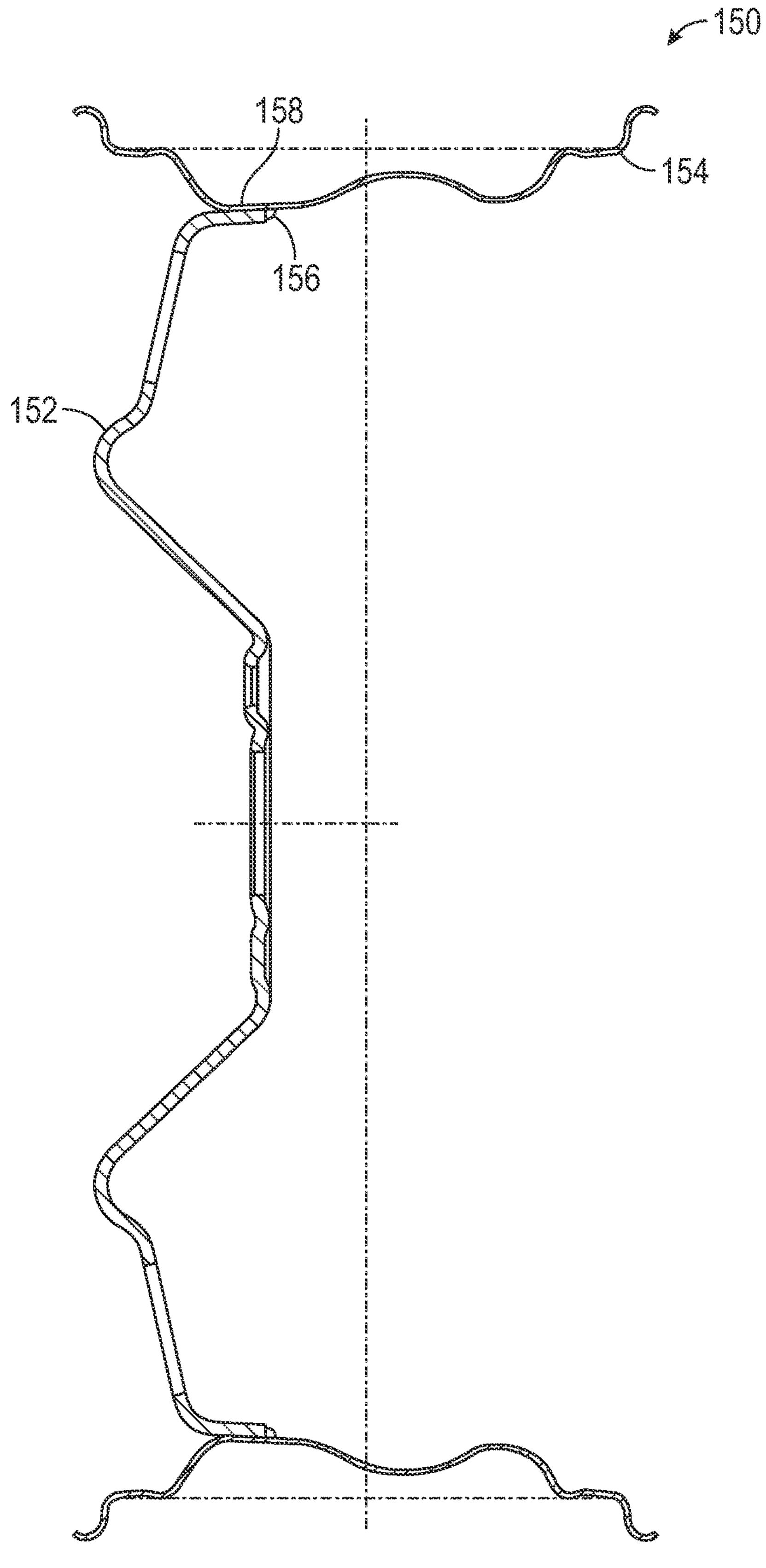
FIG. 6 is a cross-sectional view of a second embodiment of vehicle wheel in accordance with the present invention.

There is illustrated in FIG. 6 an alternate embodiment of a wheel, indicated generally at 150. The wheel 150 includes a wheel disc 152 and a rim 154. The structure of the wheel 150 is commonly referred to as a "drop center" wheel such that the wheel disc 152 is secured, such as by a weld 156, to the rim 154 at an inner surface of a well base 158 of the rim 154. As shown in FIG. 6, the cross-sectional profile shape of the rim 154 may be similar to the profile shape of the rim 14 of the wheel 10 described above in accordance with the present invention.

Figure 7:
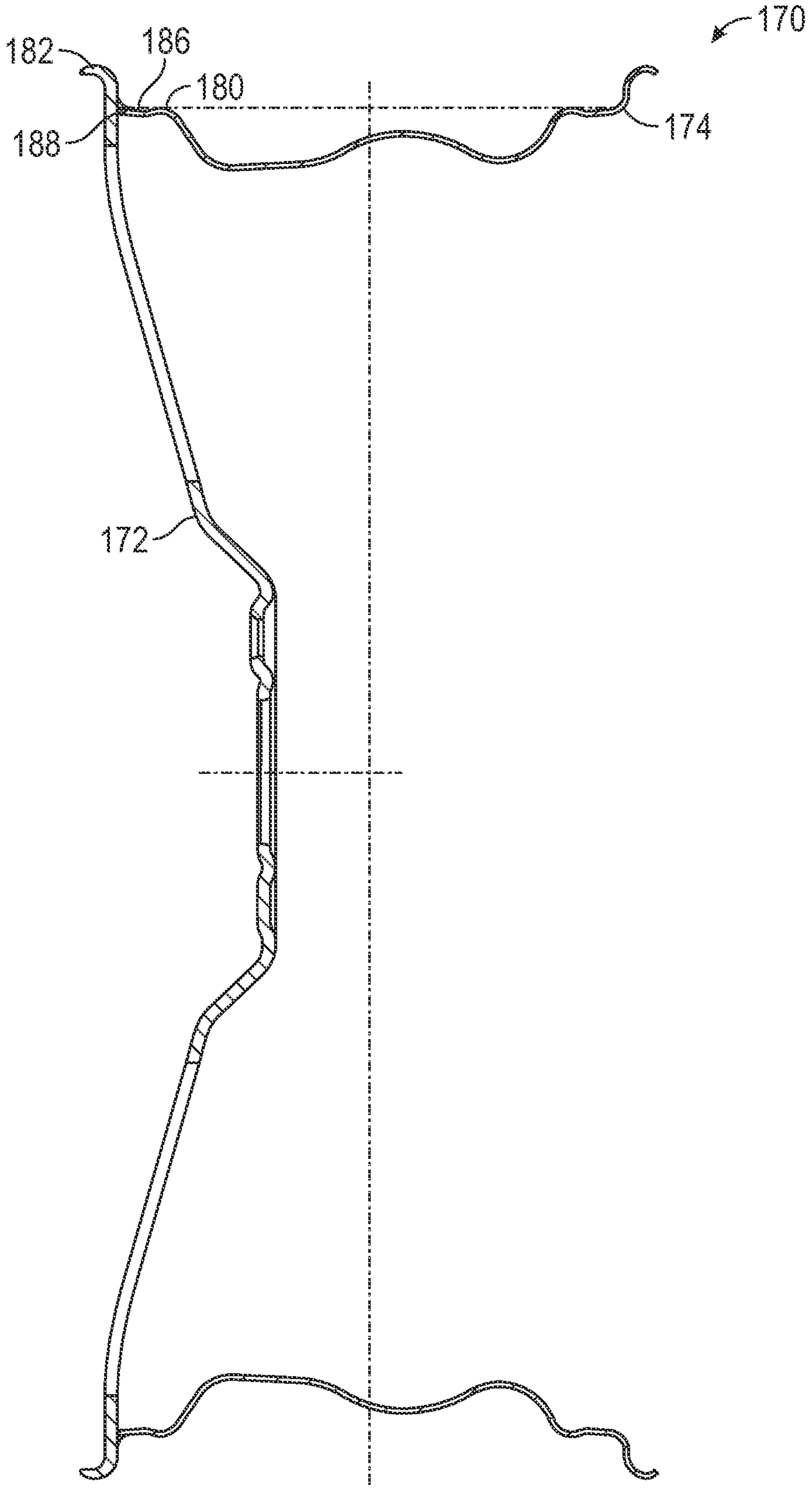
FIG. 7 is a cross-sectional view of a third embodiment of a vehicle wheel in accordance with the present invention.
Figure 8:
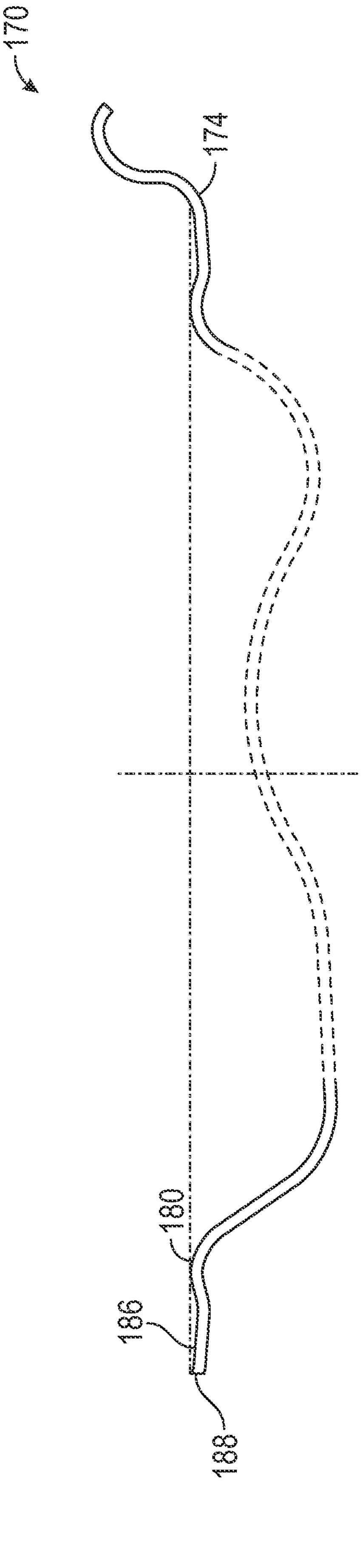
FIG. 8 is an enlarged schematic cross-sectional view of a portion of the rim of the wheel of FIG. 7.

There is illustrated in FIG. 7 another alternate embodiment of a wheel, indicated generally at 170. The wheel 170 includes a wheel disc 172 and a rim 174. The wheel 170 is of a type commonly referred to as a "full face" wheel. Although the cross-sectional profile of the rim 174 is similar to the rim 14, one of the differences is that the rim 174 has an outboard portion 180 which does not include a bead seat retaining flange. Instead, the full face wheel disc 172 includes a bead seat retaining flange 182 formed on the outer circumferential edge of the wheel disc 172. The outboard portion of the rim 174 essentially ends at a bead seat 186 such that a tip or end 188 of the bead seat 186 is welded or otherwise attached to a rear surface of the wheel disc 172. The detail of the profile of the rim 174 can be seen in the enlarged schematic view of FIG. 8. Thus, the features of the rim in accordance with the present invention as described above with respect to FIGS. 1 through 4 may be used in the wheels 150 and 170.

As can be understood, the specific numbers, ranges, dimensions and/or percentages disclosed herein can be other than illustrated and described if so desired.

The principle and mode of operation of this invention have been explained and illustrated in its preferred embodiments. However, it must be understood that this invention may be practiced otherwise than as specifically explained and illustrated without departing from its spirit or scope.

What is claimed is:

1. A vehicle wheel comprising:
- an annular rim defining an axis and inboard and outboard sides, the rim including:
  - an outboard bead seat;
  - an inboard bead seat;
  - an annular well flank connected to the outboard bead seat and extending radially inwardly and towards the inboard side of the rim;
  - a well base connected to the well flank, wherein the well base defines a flat profile, and wherein the well base defines an inner-most radial dimension of the rim; and a transition portion defined between the well flank and the inboard bead seat, wherein the transition portion is formed by only three curved portions having a circumferential corrugated profile having:

a circumferentially concave-shaped outboard groove connected to the well base at a first tangency point;

a circumferentially convex-shaped ridge directly connected to the outboard groove at a second tangency point; and a circumferentially concave-shaped inboard groove directly connected to the ridge at a third tangency point, and wherein the inboard groove is connected to the inboard bead seat at a fourth tangency point; and a wheel disc secured to the rim, wherein the wheel disc includes a hub located centrally within the wheel disc and having a plurality of bolt holes formed therein;

wherein the transition portion has an outer surface and an inner surface defining a thickness therebetween such that the thickness is constant between the first and fourth tangency points or that the thickness of at least a portion of the transition portion varies between the first and fourth tangency points.

2. The vehicle wheel of claim 1, wherein the flat profile of the well base has a frustoconical shape.

3. The vehicle wheel of claim 2, wherein the frustoconical shape of the well base is formed at an angle with respect to the wheel axis within the range of 0 degrees to 25 degrees.

4. The vehicle wheel of claim 1, wherein the well base has a constant thickness.

5. The vehicle wheel of claim 1, wherein the well base is smoothly connected to the well flank via a curved portion.

6. The vehicle wheel of claim 1, wherein the at least a portion of the transition portion has a thinning between 7% to 30% the thickness of the well flank.

7. The vehicle wheel of claim 1, wherein an outboard side of the outboard groove adjacent the first tangency point has a greater thickness than an inboard side of the outboard groove adjacent the second tangency point.

8. The vehicle wheel of claim 1, wherein the ridge has a constant thickness between the second and third tangency points.

9. The vehicle wheel of claim 1, wherein an inboard side of the inboard groove adjacent the fourth tangency point has a greater thickness than an outboard side of the inboard groove adjacent the third tangency point.

10. The vehicle wheel of claim 1, wherein the outboard groove has an arcuate shape defined by a first radius.

11. The vehicle wheel of claim 10, wherein the ridge has an arcuate shape defined by a second radius.

12. The vehicle wheel of claim 11, wherein the inboard groove has an arcuate shape defined by a third radius.

13. The vehicle wheel of claim 12, wherein the second radius is greater than either of the first and third radii.

14. The vehicle wheel of claim 12, wherein the first radius is greater than the third radius.

15. The vehicle wheel of claim 1, wherein the rim includes an inboard bead seat retaining flange connected to the inboard bead seat.

16. The vehicle wheel of claim 15, wherein the rim includes an outboard bead seat retaining flange connected to the outboard bead seat.

17. The vehicle wheel of claim 16, wherein the wheel is a bead seat wheel such that the wheel disc is secured to the rim at the outboard beat seat.

18. The vehicle wheel of claim 16, wherein the wheel is a drop center wheel such that the wheel disc is secured to the rim at the well base.

19. The vehicle wheel of claim 15, wherein the wheel is a full faced wheel such that the wheel disc includes an outboard bead seat retaining flange integrally formed therein, and wherein the wheel disc is connected to the rim at the outboard bead seat.

20. The vehicle wheel of claim 1, wherein the rim is produced by forming a metallic blank.

21. The vehicle wheel of claim 20, wherein the metallic blank is a steel blank.

22. The vehicle wheel of claim 21, wherein the rim is formed into a final desired shape by a flow forming process.

23. The vehicle wheel of claim 22, wherein the wheel disc is produced by forming a metallic blank by a flow forming process.

24. A wheel rim defining an axis and inboard and outboard sides, the rim comprising:

an outboard bead seat;

an inboard bead seat;

an annular well flank connected to the outboard bead seat and extending radially inwardly and towards the inboard side of the rim;

a well base connected to the well flank, wherein the well base defines a flat profile, and wherein the well base defines an inner-most radial dimension of the rim; and a transition portion defined between the well flank and the inboard bead seat, wherein the transition portion is formed by only three curved portions having a circumferential corrugated profile having:

a circumferentially concave-shaped outboard groove connected to the well base at a first tangency point;

a circumferentially convex-shaped ridge directly connected to the outboard groove at a second tangency point; and a circumferentially concave-shaped inboard groove directly connected to the ridge at a third tangency point, and wherein the inboard groove is connected to the inboard bead seat at a fourth tangency point.

25. A method for producing a vehicle wheel comprising the steps of:

providing an annular rim defining an axis and inboard and outboard sides, the rim including:

an outboard bead seat;

an inboard bead seat;

an annular well flank connected to the outboard bead seat and extending radially inwardly and towards the inboard side of the rim;

a well base connected to the well flank, wherein the well base defines a flat profile, and wherein the well base defines an inner-most radial dimension of the rim; and a transition portion defined between the well flank and the inboard bead seat, wherein the transition portion is produced by a flow forming process and is formed by only three curved portions having a circumferential corrugated profile having:

a circumferentially concave-shaped outboard groove connected to the well base at a first tangency point;

a circumferentially convex-shaped ridge directly connected to the outboard groove at a second tangency point; and a circumferentially concave-shaped inboard groove directly connected to the ridge at a third tangency point, and wherein the inboard groove is connected to the inboard bead seat at a fourth tangency point; and securing a wheel disc secured to the rim to produce the vehicle wheel, wherein the wheel disc includes a hub located centrally within the wheel disc and having a plurality of bolt holes formed therein.

* * * * *